United States Patent
Kobayashi et al.

(10) Patent No.: US 7,342,377 B2
(45) Date of Patent: Mar. 11, 2008

(54) STEPPING-MOTOR CONTROL APPARATUS AND METHOD OF CONTROLLING THE APPARATUS

(75) Inventors: Hidenori Kobayashi, Sunto-gun (JP); Shunichi Ono, Izu (JP); Kazumasa Takada, Mishima (JP); Takashi Okano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/420,206

(22) Filed: May 24, 2006

(65) Prior Publication Data

US 2007/0273321 A1 Nov. 29, 2007

(51) Int. Cl.
*H02P 8/22* (2006.01)
(52) U.S. Cl. ...................................... 318/696
(58) Field of Classification Search ................ 318/685, 318/696, 701
See application file for complete search history.

(56) References Cited

U.S. PATENT DOCUMENTS

| | | | | |
|---|---|---|---|---|
| 4,529,923 A | * | 7/1985 | Izumi et al. | 318/696 |
| 5,583,410 A | * | 12/1996 | Jacobson et al. | 318/696 |
| 5,977,739 A | * | 11/1999 | Ohsawa | 318/685 |
| 6,222,340 B1 | * | 4/2001 | Kawabata et al. | 318/685 |
| 2003/0161011 A1 | | 8/2003 | Iseki | |

FOREIGN PATENT DOCUMENTS

| | | |
|---|---|---|
| JP | H08-98593 | 9/1994 |
| JP | 2000-300776 | 4/1999 |
| JP | 2003-259690 | 11/2005 |

* cited by examiner

*Primary Examiner*—Bentsu Ro
(74) *Attorney, Agent, or Firm*—SoCal IP Law Group LLP; Steven C. Sereboff; John E. Gunther

(57) ABSTRACT

An excitation phase pattern used to manage only the number of phases being excited in W1-2 phase excitation, and an excitation phase pattern used to manage only the number of phases being excited in 2W1-2-phase excitation are generated. The excitation phase patterns thus generated are monitored on the monitor.

19 Claims, 6 Drawing Sheets

STEPPING-MOTOR CONTROL APPARATUS AND METHOD OF CONTROLLING THE APPARATUS

BACKGROUND OF THE INVENTION

A stepping motor has characteristics as follows.

Because it is able to control the angle of rotation using the number of supplied pulse signals, no feedback is necessary, which enables precise control to be achieved with a simple configuration.

The speed of rotation can be changed by changing the frequency of a pulse signal.

Once the initial position of a movable body to be driven is determined, the movable body can be moved to a target position without the need to detect the position of the movable body. For example, it is suitable to drive a carriage and a mirror in an image forming apparatus.

Because it has an excellent response when activated, stopped, or rotated inversely, it is suitable to drive, for example, a resist roller in an image forming apparatus.

As a driving method of the stepping-motor, there are 2-phase excitation, 1-2-phase excitation, W1-2-phase excitation, 2W1-2-phase excitation, and so forth. In 2-phase excitation and 1-2-phase excitation, an excitation phase pattern comprising four steps is repeated for one rotation. In W1-2-phase excitation, because it includes current control, an excitation phase pattern comprising 16 steps is repeated for one rotation. In 2W1-2-phase excitation, because it also includes current control, an excitation phase pattern comprising 32 steps is repeated for one rotation.

When the stepping motor as above is driven, it is necessary to manage which phase among the respective phases is being excited.

In the case of 2-phase excitation and 1-2-phase excitation, the management is easy because the excitation phase pattern is simple.

In the case of W1-2-phase excitation, however, the management becomes complicated because its excitation phase pattern including current control is complicated. In the case of 2W1-2 phase excitation, the management is complicated, too, because its excitation phase pattern including current control is complicated.

BRIEF SUMMARY OF THE INVENTION

A stepping-motor control apparatus according to one embodiment of the invention therefore has an object to be able to manage excitation of the stepping motor with ease regardless of differences in excitation methods.

A stepping-motor control apparatus according to one embodiment of the invention controls a stepping-motor, and includes: a clock generation unit configured to generate a clock signal; an excitation phase pattern generation unit configured to generate, on the basis of the clock signal generated in the clock generation unit, an excitation phase pattern for 2-phase excitation and an excitation phase pattern for 1-2-phase excitation, and also to generate an excitation phase pattern used to manage only the number of phases being excited in W1-2-phase excitation and an excitation phase pattern used to manage only the number of phases being excited in 2W1-2-phase excitation; a selection unit configured to select either one of the excitation phase pattern generated in the excitation phase pattern generation unit and the clock signal generated in the clock generation unit in the cases of the 2-phase excitation and the 1-2-phase excitation, and to select the clock signal generated in the clock generation unit in the cases of the W1-2-phase excitation and the 2W1-2-phase excitation; a motor driver configured to execute the 2-phase excitation and the 1-2-phase excitation on the stepping-motor according to the excitation phase pattern or the clock signal selected in the selection unit, and also to execute the W1-2-phase excitation and the 2W1-2-phase excitation on the stepping-motor according to the clock signal selected in the selection unit; and a monitor configured to monitor the excitation phase pattern generated in the excitation phase pattern generation unit, wherein the selection unit selects either one of the excitation phase pattern generated in the excitation phase pattern generation unit and the clock signal generated in the clock generation unit to match with the motor driver in the cases of the 2-phase excitation and the 1-2-phase excitation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Hereinafter, one embodiment of the invention will be described with reference to the drawings.

Figure 1:
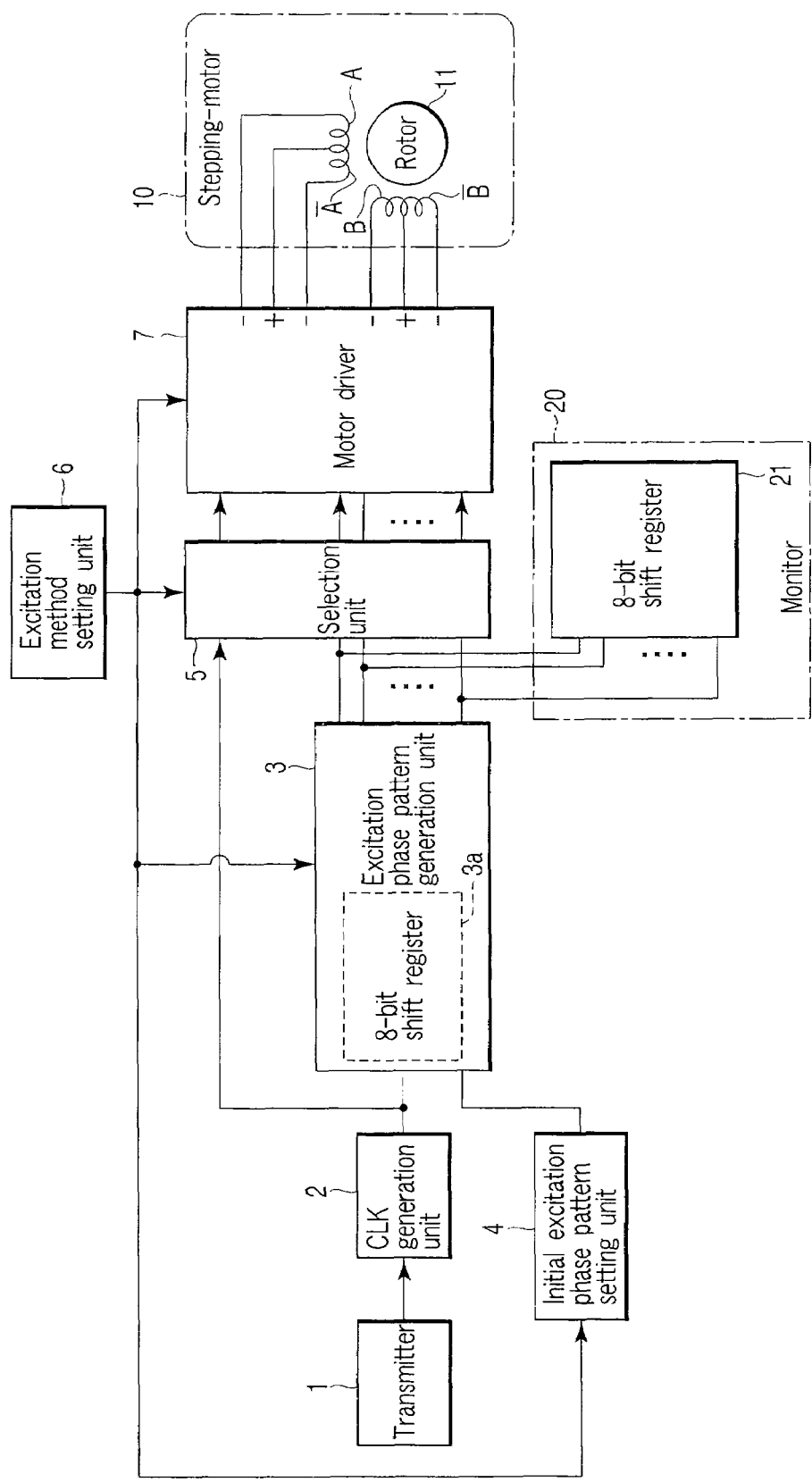
FIG. 1 is a block diagram depicting the configuration in one embodiment.

As is shown in FIG. 1, a reference clock signal is transmitted from a transmitter 1 to a clock (CLK) generation unit 2. The clock generation unit 2 generates a clock signal at a specific frequency on the basis of the reference clock signal from the transmitter 1. The clock signal thus generated is supplied to an excitation phase pattern generation unit 3 and a selection unit 5.

On the basis of the clock signal generated in the clock signal generation unit 2, the excitation phase pattern generation unit 3 generates an excitation phase pattern for at least four steps of an excitation phase pattern for 2-phase excitation and an excitation phase pattern for at least eight steps for 1-2-phase excitation, and also generates an excitation phase pattern for at least four steps used to manage only the number of phases being excited in W1-2-phase excitation, and an excitation phase pattern for at least eight steps used to manage only the number of phases being excited in 2W1-2-phase excitation. According to which excitation method an excitation phase pattern should be generated is determined based on the excitation method set in an excitation method setting unit 6.

Also, the excitation phase pattern generation unit 3 includes an 8-bit shift register 3a to hold the excitation phase pattern for one step that has been generated, and it shift-outputs the content of the shift register 3a each time the excitation phase pattern for one step is generated.

It should be noted that an initial excitation phase pattern setting unit 4 is connected to the excitation phase pattern generation unit 3. The initial excitation phase pattern setting unit 4 sets an excitation phase pattern that is generated first in the excitation phase pattern generation unit 3 according to the content set in the excitation method setting unit 6.

The excitation phase pattern for one step that is shift-outputted sequentially from the shift register 3a in the excitation phase pattern generation unit 3 is supplied to the selection unit 5. In the cases where 2-phase excitation and 1-2-phase excitation are set in the excitation method setting unit 6, the selection unit 5 selects either one of the excitation phase pattern generated in the excitation phase pattern generation unit 3 and the clock signal generated in the clock generation unit 2 to match with the interface of a motor driver 7 described below. In the cases where W1-2-phase excitation and 2W1-2-phase excitation are set in the excitation method setting unit 6, the selection unit 5 selects the clock signal generated in the clock generation unit 2. The excitation phase pattern or clock signal thus selected is supplied to the motor driver 7.

The motor driver 7 executes 2-phase excitation and 1-2-phase excitation on a stepping-motor 10 according to the excitation phase pattern or the clock signal selected in the selection unit 5, and executes W1-2-phase excitation and 2W1-2-phase excitation on the stepping-motor 10 according to the clock signal selected in the selection unit 5.

The stepping-motor 10 is, for example, a 4-phase stepping-motor comprising exciting coils A, B, invA, and invB, and a rotor 11.

The excitation phase pattern for one step that is shift-outputted sequentially from the shift register 3a in the excitation phase pattern generation unit 3 is supplied to a monitor 20. The monitor 20 includes an 8-bit shift register 21 to hold an excitation phase pattern for one step that is shift-outputted sequentially from the shift register 3a in the excitation phase pattern generation unit 3.

Functions will be described.

Figure 2:
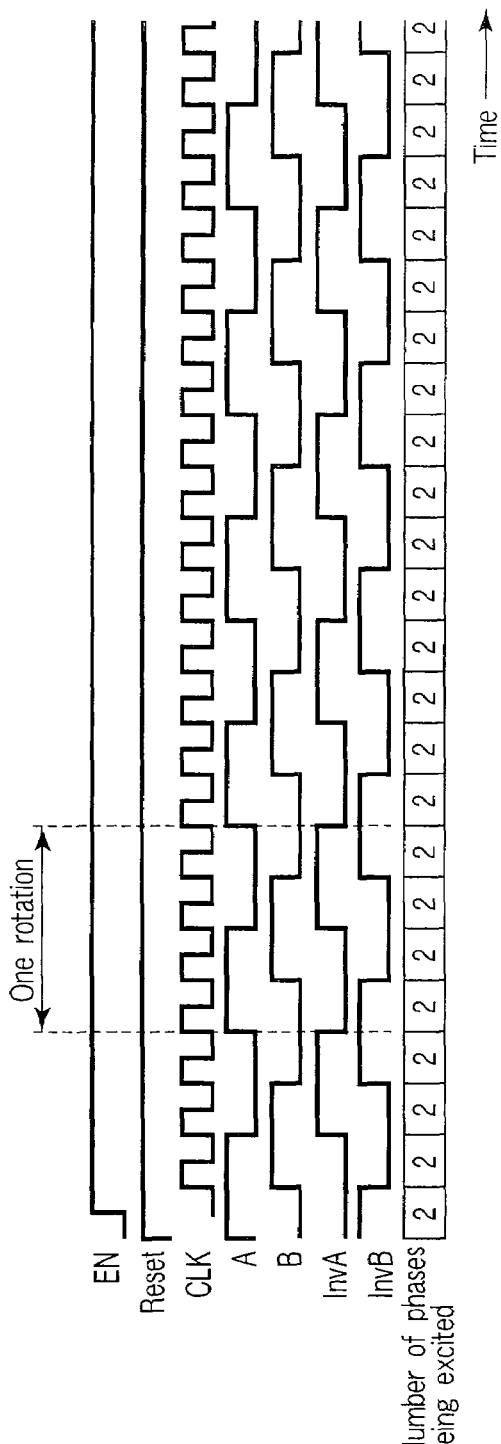
FIG. 2 is a time chart used to describe 2-phase excitation in one embodiment.

(1) In 2-phase excitation, as is shown in FIG. 2, the exciting coils A, B, invA, and invB of the stepping-motor 10 are excited over a 2-step period while being shifted sequentially by one step in sync with the clock signal.

In 2-phase excitation, the excitation phase pattern for at least four steps corresponding to one rotation of the stepping-motor 10 is generated in the excitation phase pattern generation unit 3. Each excitation phase pattern thus generated is expressed by a 4-bit signal exhibiting "1" and "0" that directly corresponds to excitation of the exciting coils A, B, invA, and invB of FIG. 2. Each excitation phase pattern is selected in the selection unit 5, and supplied to the motor driver 7. The motor driver 7 executes 2-phase excitation on the stepping-motor 10 according to the excitation phase pattern supplied from the selection unit 5.

In this case, each excitation phase pattern supplied to the motor driver 7 is stored in a shift register 21 in the monitor 20 for each step. By monitoring the content of the shift register 21, it is possible to manage the phase status of the stepping-motor 10 completely.

Figure 3:
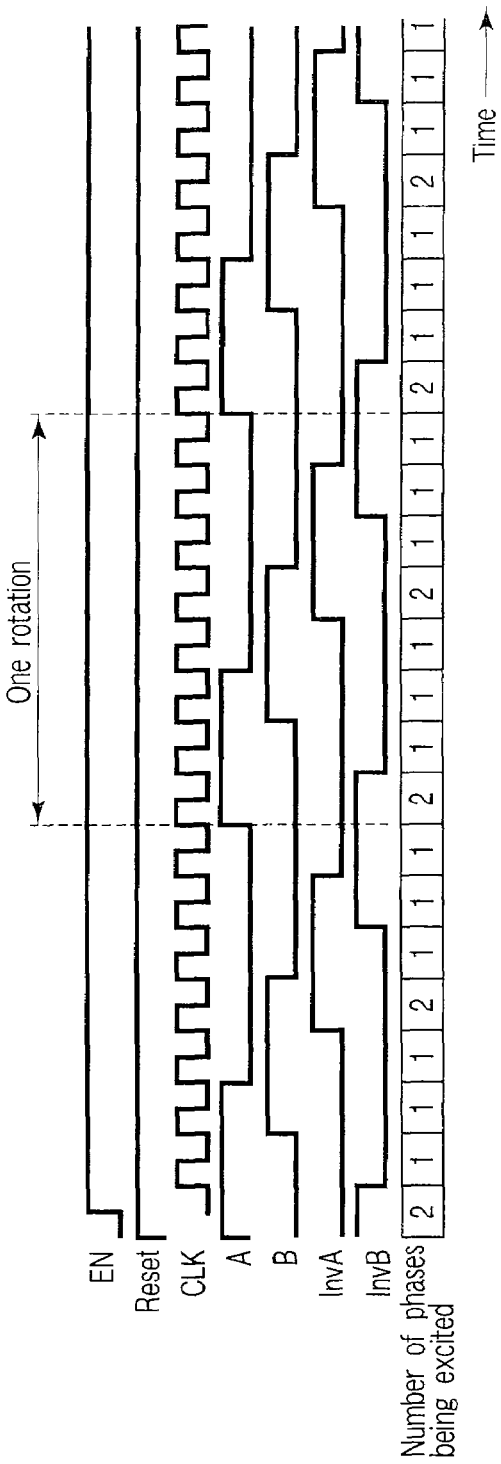
FIG. 3 is a time chart used to describe 1-2-phase excitation in one embodiment.

(2) In 1-2-phase excitation, as is shown in FIG. 3, the exciting coils A, B, invA, and invB of the stepping-motor 10 are excited over a 3-step period while being shifted sequentially by two steps in sync with the clock signal.

In 1-2-phase excitation, the excitation phase pattern for at least eight steps corresponding to one rotation of the stepping-motor 10 is generated in the excitation phase pattern generation unit 3. Each excitation phase pattern thus generated is expressed by a 4-bit signal exhibiting "1" and "0" that directly corresponds to excitation of the exciting coils A, B, invA, and invB of FIG. 2. Each excitation phase pattern is selected in the selection unit 5, and supplied to the motor driver 7. The motor driver 7 executes 1-2-phase excitation on the stepping-motor 10 according to the excitation phase pattern or the clock signal supplied from the selection unit 5.

In this case, each excitation phase pattern supplied to the motor driver 7 is stored in the shift register 21 in the monitor 20 for each step. By monitoring the content of the shift register 21, it is possible to manage the phase status of the stepping-motor 10 completely.

Figure 4:
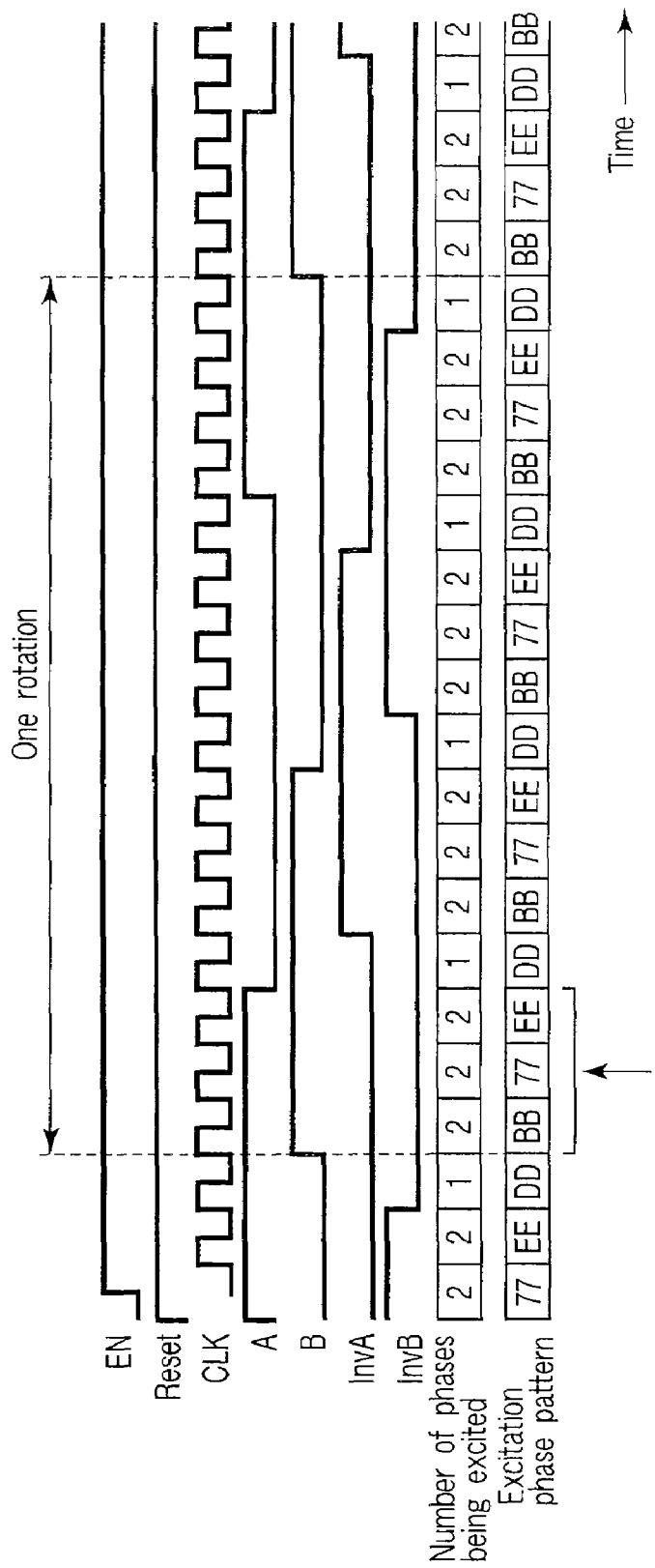
FIG. 4 is a time chart used to describe W1-2-phase excitation in one embodiment.

(3) In W1-2-phase excitation, as is shown in FIG. 4, the exciting coils A, B, invA, and invB of the stepping-motor 10 are excited over a 7-step period while being shifted sequentially by four steps in sync with the clock signal using a current that varies in each step.

In W1-2-phase excitation, the clock signal generated in the clock generation unit 2 is selected in the selection unit 5, and supplied to the motor driver 7. The motor driver 7 reads out each excitation phase pattern from an internal memory according to the clock signal supplied from the selection unit 5, and executes W1-2-phase excitation on the stepping-motor 10 according to each excitation phase pattern. Because each excitation phase pattern read out from the internal memory includes current control, it is expressed by a 16-bit signal exhibiting "1" and "0".

In this case, the excitation phase pattern generation unit 3 generates an excitation phase pattern for at least four steps used to manage only the number of phases being excited in W1-2-phase excitation. The excitation phase pattern for at least four steps used to manage only the number of phases being excited is expressed by an 8-bit signal exhibiting "1" and "0" as is shown on the right side of FIG. 5.

Each excitation phase pattern is stored in the shift register 21 in the monitor 20 for each step. By monitoring the content of the shift register 21, it is possible to manage the number of phases being excited in the stepping-motor 10.

In order to control the stepping-motor 10 to rotate and stop smoothly, it is sufficient to manage the number of phases being excited alone.

Suppose that the phase status of the stepping-motor 10 is to be managed completely in W1-2-phase excitation, it is necessary to monitor the data same as each excitation phase pattern read out from the internal memory of the motor driver 7. This raises the need to prepare data expressed by 16-bit signals exhibiting "1" and "0" for 16 steps as is shown on the left side of FIG. 5. In order to monitor this data, two 8-bit shift registers are necessary, which not only increases the cost, but also deteriorates processing efficiency because data transmission takes longer.

Figure 5:
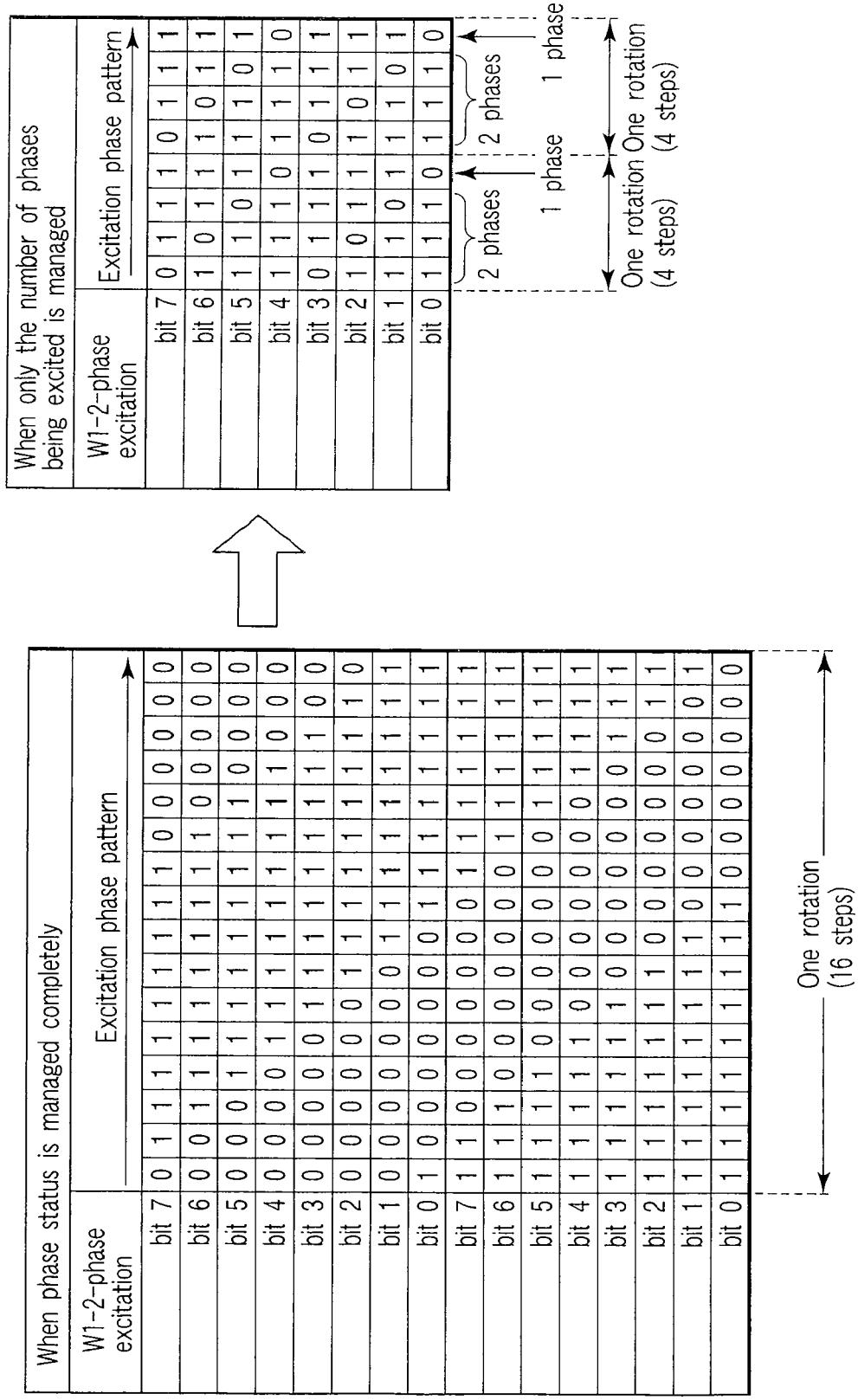
FIG. 5 is a view showing an excitation phase pattern generated for W1-2-phase excitation in one embodiment.
Figure 6:
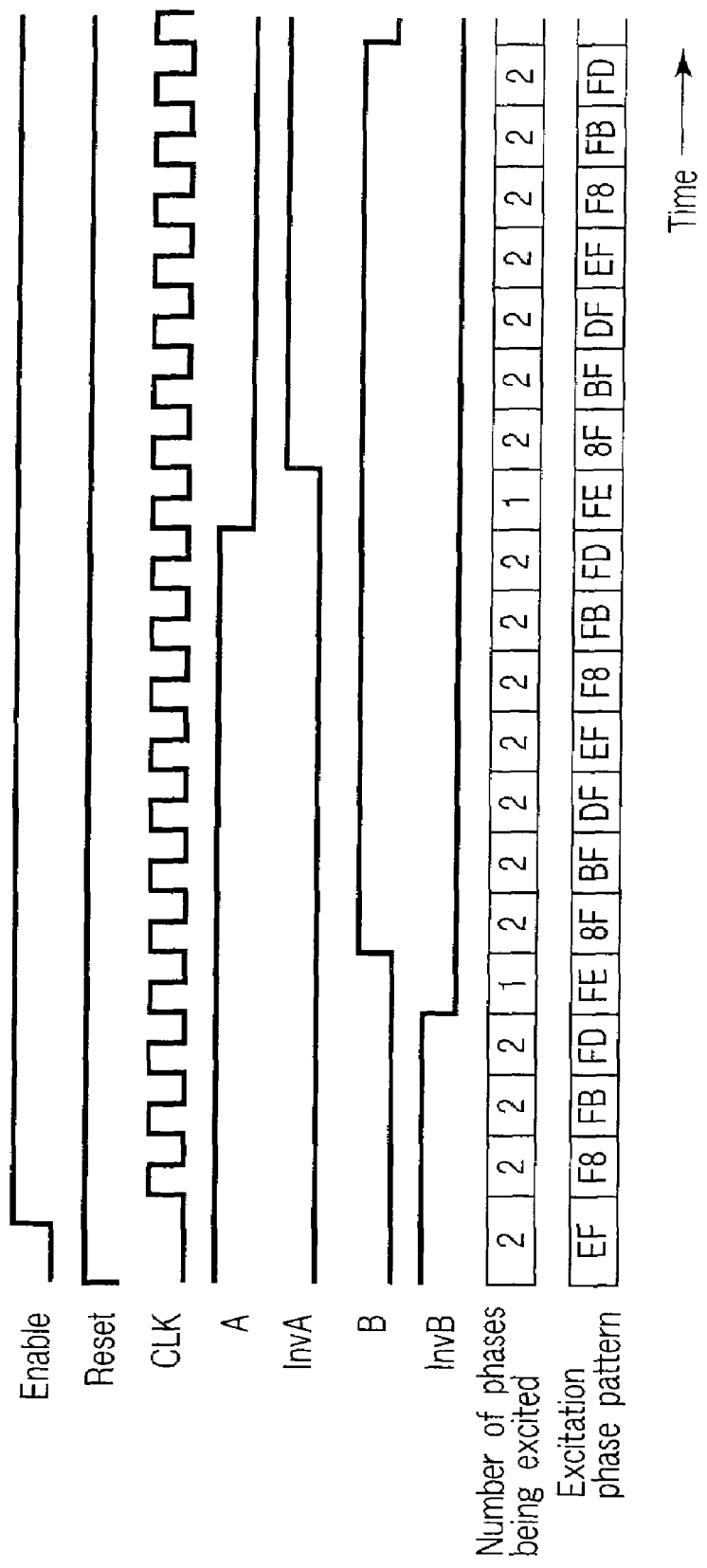
FIG. 6 is a time chart used to describe 2W1-2-phase excitation in one embodiment.

(4) In 2W1-2-phase excitation, as is shown in FIG. 5, the exciting coils A, B, invA, and invB of the stepping-motor 10 are excited over a 15-step period while being shifted sequentially by 16 steps in sync with the clock signal using a current that varies in each step.

In 2W1-2-phase excitation, the clock signal generated in the clock generation unit 2 is selected in the selection unit 5, and supplied to the motor driver 7. The motor driver 7 reads out each excitation phase pattern from an internal memory according to the clock signal supplied from the selection unit 5, and executes 2W1-2-phase excitation on the stepping-motor 10 according to each excitation phase pattern. Because each excitation phase pattern read out from the internal memory includes current control, it is expressed by a 32-bit signal exhibiting "1" and "0".

Figure 7:
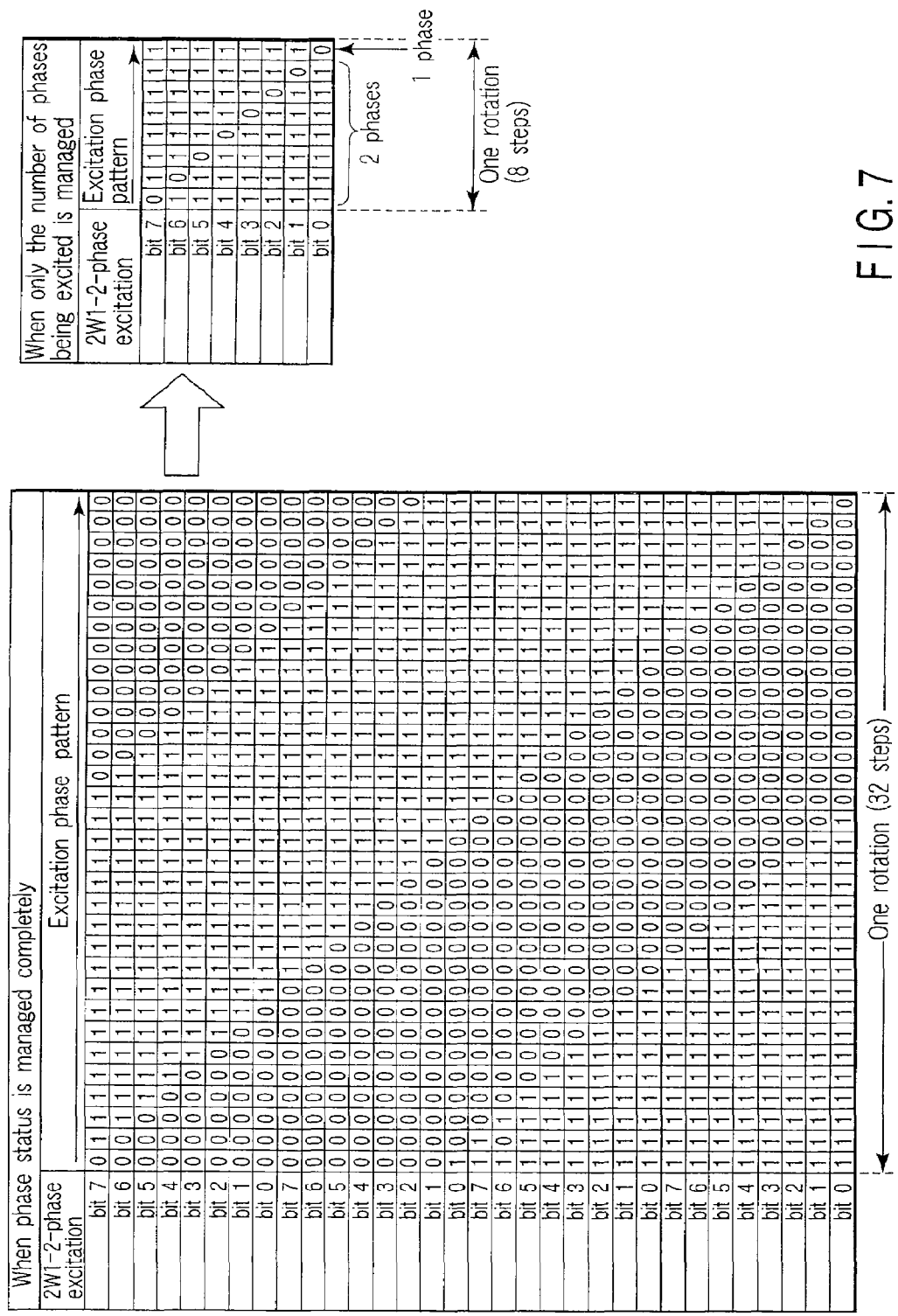
FIG. 7 is a view showing an excitation phase pattern generated for 2W1-2 phase excitation in one embodiment.

In this case, the excitation phase pattern generation unit 3 generates an excitation phase pattern for at least eight steps used to manage only the number of phases being excited in 2W1-2-phase excitation. The excitation phase pattern for at least eight steps used to manage only the number of phases being excited is expressed by an 8-bit signal exhibiting "1" and "0" as is shown on the right side of FIG. 7.

Each excitation phase pattern is stored in the shift register 21 in the monitor 20 for each step. By monitoring the content of the shift register 21, it is possible to manage the number of phases being excited in the stepping-motor 10.

In order to control the stepping-motor 10 to rotate and stop smoothly, it is sufficient to manage the number of phases being excited alone.

Suppose that the phase status of the stepping-motor 10 is to be managed completely in 2W1-2-phase excitation, it is necessary to monitor the data same as each excitation phase pattern read out from the internal memory of the motor driver 7. This raises the need to prepare data expressed by 32-bit signals exhibiting "1" and "0" for 32 steps as is shown on the left side of FIG. 7. In order to monitor this data, four 8-bit shift registers are necessary, which not only increases the cost, but also deteriorates processing efficiency because data transmission takes longer.

As has been described, it is possible to manage excitation of the stepping-motor 10 with ease using the common monitor 20 regardless of differences in excitation methods.

Additional advantages and modifications will readily occur to those skilled in the art. Therefore, the invention in its broader aspects is not limited to the specific details and representative embodiment shown and described herein. Accordingly various modifications may be made without departing from the sprit or scope of the general inventive concept as defined by the appended claims and their equivalents.

What is claimed is:

1. A stepping-motor control apparatus that controls a stepping-motor, comprising:
    a clock generation unit configured to generate a clock signal;
    an excitation phase pattern generation unit configured to generate, on the basis of the clock signal generated in the clock generation unit, an excitation phase pattern for 2-phase excitation and an excitation phase pattern for 1-2-phase excitation, and also to generate an excitation phase pattern used to manage only the number of phases being excited in W1-2-phase excitation and an excitation phase pattern used to manage only the number of phases being excited in 2W1-2-phase excitation;
    a selection unit configured to select either one of the excitation phase pattern generated in the excitation phase pattern generation unit and the clock signal generated in the clock generation unit in the cases of the 2-phase excitation and the 1-2-phase excitation, and to select the clock signal generated in the clock generation unit in the cases of the W1-2-phase excitation and the 2W1-2-phase excitation;
    a motor driver configured to execute the 2-phase excitation and the 1-2-phase excitation on the stepping-motor according to the excitation phase pattern or the clock signal selected in the selection unit, and also to execute the W1-2-phase excitation and the 2W1-2-phase excitation on the stepping-motor according to the clock signal selected in the selection unit; and
    a monitor configured to monitor the excitation phase pattern generated in the excitation phase pattern generation unit,
    wherein the selection unit selects either one of the excitation phase pattern generated in the excitation phase pattern generation unit and the clock signal generated in the clock generation unit to match with the motor driver in the cases of the 2-phase excitation and the 1-2-phase excitation.

2. The apparatus according to claim 1, further comprising:
    a transmitter configured to transmit a reference clock signal used as a reference for generation of the clock signal in the clock generation unit.

3. The apparatus according to claim 2, wherein:
    the clock generation unit generates a clock signal at a specific frequency on the basis of the reference clock signal from the transmitter.

4. The apparatus according to claim 1, further comprising:
    a setting unit configured to set an excitation method for the stepping-motor.

5. The apparatus according to claim 4, wherein:
    the selection unit selects either one of the excitation phase pattern generated in the excitation phase pattern generation unit and the clock signal generated in the clock generation unit to match with the motor driver in a case where either one of the 2-phase excitation and the 1-2-phase excitation is set in the setting unit, and selects the clock signal generated in the clock generation unit in a case where either one of the W1-2-phase excitation and the 2W1-2-phase excitation is set in the setting unit.

6. The apparatus according to claim 4, further comprising:
    an initial excitation phase pattern setting unit configured to set an excitation phase pattern generated first in the excitation phase pattern generation unit according to a content set in the setting unit.

7. The apparatus according to claim 1, wherein:
    on the basis of the clock signal generated in the clock generation unit, the excitation phase pattern generation unit generates an excitation phase pattern for at least four steps of an excitation phase pattern for the 2-phase excitation and an excitation phase pattern for at least eight steps for the 1-2-phase excitation, and also generates an excitation phase pattern for at least four steps used to manage only the number of phases being excited in the W1-2-phase excitation, and an excitation phase pattern for at least eight steps used to manage only the number of phases being excited in the 2W1-2-phase excitation.

8. The apparatus according to claim 7, wherein:
    the excitation phase pattern generation unit includes an 8-bit shift register to hold the excitation phase pattern for one step that has been generated, and shift-outputs a content of the shift register each time an excitation phase pattern for one step is generated.

9. The apparatus according to claim 8, wherein:
    the monitor includes an 8-bit shift register to hold the excitation phase pattern shifted from the shift register in the excitation phase pattern generation unit.

10. A stepping-motor control apparatus that controls a stepping-motor, comprising:

clock generation means for generating a clock signal;

excitation phase pattern generation means for generating, on the basis of the clock signal generated in the clock generation means, an excitation phase pattern for 2-phase excitation and an excitation phase pattern for 1-2-phase excitation, and also generating an excitation phase pattern used to manage only the number of phases being excited in W1-2-phase excitation and an excitation phase pattern used to manage only the number of phases being excited in 2W1-2-phase excitation;

selection means for selecting either one of the excitation phase pattern generated in the excitation phase pattern generation means and the clock signal generated in the clock generation means in the cases of the 2-phase excitation and the 1-2-phase excitation, and selecting the clock signal generated in the clock generation means in the cases of the W1-2-phase excitation and the 2W1-2-phase excitation;

driver means for executing the 2-phase excitation and the 1-2-phase excitation on the stepping-motor according to the excitation phase pattern or the clock signal selected in the selection means, and also executing the W1-2-phase excitation and the 2W1-2-phase excitation on the stepping-motor according to the clock signal selected in the selection means; and monitoring means for monitoring the excitation phase pattern generated in the excitation phase pattern generation means, wherein the selection means selects either one of the excitation phase pattern generated in the excitation phase pattern generation means and the clock signal generated in the clock generation means to match with the driver means in the cases of the 2-phase excitation and the 1-2-phase excitation.

11. The apparatus according to claim 10, further comprising:

a transmitter configured to transmit a reference clock signal used as a reference for generation of the clock signal in the clock generation means.

12. The apparatus according to claim 11, wherein:

the clock generation means generates a clock signal at a specific frequency on the basis of the reference clock signal from the transmitter.

13. The apparatus according to claim 11, wherein:

on the basis of the clock signal generated in the clock generation means, the excitation phase pattern generation means generates an excitation phase pattern for at least four steps of an excitation phase pattern for the 2-phase excitation and an excitation phase pattern for at least eight steps for the 1-2-phase excitation, and also generates an excitation phase pattern for at least four steps used to manage only the number of phases being excited in the W1-2-phase excitation, and an excitation phase pattern for at least eight steps used to manage only the number of phases being excited in the 2W1-2-phase excitation.

14. The apparatus according to claim 13, wherein:

the excitation phase pattern generation means includes an 8-bit shift register to hold the excitation phase pattern for one step that has been generated, and shift-outputs a content of the shift register each time an excitation phase pattern for one step is generated.

15. The apparatus according to claim 14, wherein:

the monitoring means includes an 8-bit shift register to hold the excitation phase pattern shifted from the shift register in the excitation phase pattern generation means.

16. The apparatus according to claim 10, further comprising:

setting means for setting an excitation method for the stepping-motor.

17. The apparatus according to claim 16, wherein:

the selection means selects either one of the excitation phase pattern generated in the excitation phase pattern generation means and the clock signal generated in the clock generation means to match with the driver means in a case where either one of the 2-phase excitation and the 1-2-phase excitation is set in the setting means, and selects the clock signal generated in the clock generation means in a case where either one of the W1-2-phase excitation and the 2W1-2-phase excitation is set in the setting means.

18. The apparatus according to claim 16, further comprising:

initial excitation phase pattern setting means for setting an excitation phase pattern generated first in the excitation phase pattern generation means according to a content set in the setting means.

19. A control method of a stepping-motor control apparatus that controls a stepping-motor, comprising:

generating a clock signal;

on the basis of the clock signal that has been generated, generating an excitation phase pattern for 2-phase excitation and an excitation phase pattern for 1-2-phase excitation, and also generating an excitation phase pattern used to manage only the number of phases being excited in W1-2-phase excitation and an excitation phase pattern used to manage only the number of phases being excited in 2W1-2-phase excitation;

selecting either one of the excitation phase pattern that has been generated and the clock signal generated in the clock generation means in the cases of the 2-phase excitation and the 1-2-phase excitation, and selecting the clock signal that has been generated in the cases of the W1-2-phase excitation and the 2W1-2-phase excitation;

executing the 2-phase excitation and the 1-2-phase excitation on the stepping-motor according to the excitation phase pattern or the clock signal that has been selected, and also executing the W1-2-phase excitation and the 2W1-2-phase excitation on the stepping-motor according to the clock signal that has been selected; and monitoring the excitation phase pattern that has been generated.

* * * * *